(12) United States Patent
Avins

(10) Patent No.: US 8,439,764 B2
(45) Date of Patent: May 14, 2013

(54) DRIVE PLATE WITH LANCED DRIVE TABS

(75) Inventor: David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 111 days.

(21) Appl. No.: 13/080,307

(22) Filed: Apr. 5, 2011

(65) Prior Publication Data

US 2011/0250975 A1 Oct. 13, 2011

Related U.S. Application Data

(60) Provisional application No. 61/322,491, filed on Apr. 9, 2010.

(51) Int. Cl.
*F16D 3/79* (2006.01)
(52) U.S. Cl.
USPC .......................................................... 464/98
(58) Field of Classification Search ............. 464/98, 464/99; 192/3.28, 3.29; 60/330; 403/309
See application file for complete search history.

(56) References Cited

U.S. PATENT DOCUMENTS

| 4,523,916 A * | 6/1985 | Kizler et al. ............... 464/98 |
| 6,277,027 B1 | 8/2001 | Schoeder et al. |
| 7,481,050 B2 | 1/2009 | Maienschein |
| 2008/0096674 A1 * | 4/2008 | Pueschel et al. ............ 464/98 |

* cited by examiner

Primary Examiner — Gregory Binda
(74) Attorney, Agent, or Firm — Simpson & Simpson, PLLC

(57) ABSTRACT

A drive plate for a torque converter, including: an annular shaped inner portion including an inner periphery for the drive plate and a plurality of openings for receiving fasteners for connection to a front cover of the torque converter; a plurality of outer portions along an outer periphery for the drive plate; and a respective drive tab for each outer portion. The respective drive tab includes: a top surface disposed outward from said each outer portion in an axial direction and substantially orthogonal to an axis of rotation for the drive plate; an opening in the top surface for receiving a fastener for connecting the drive plate to a flex plate; and first and second surfaces extending from the top surface and substantially parallel to an axis of rotation for the drive plate.

10 Claims, 6 Drawing Sheets

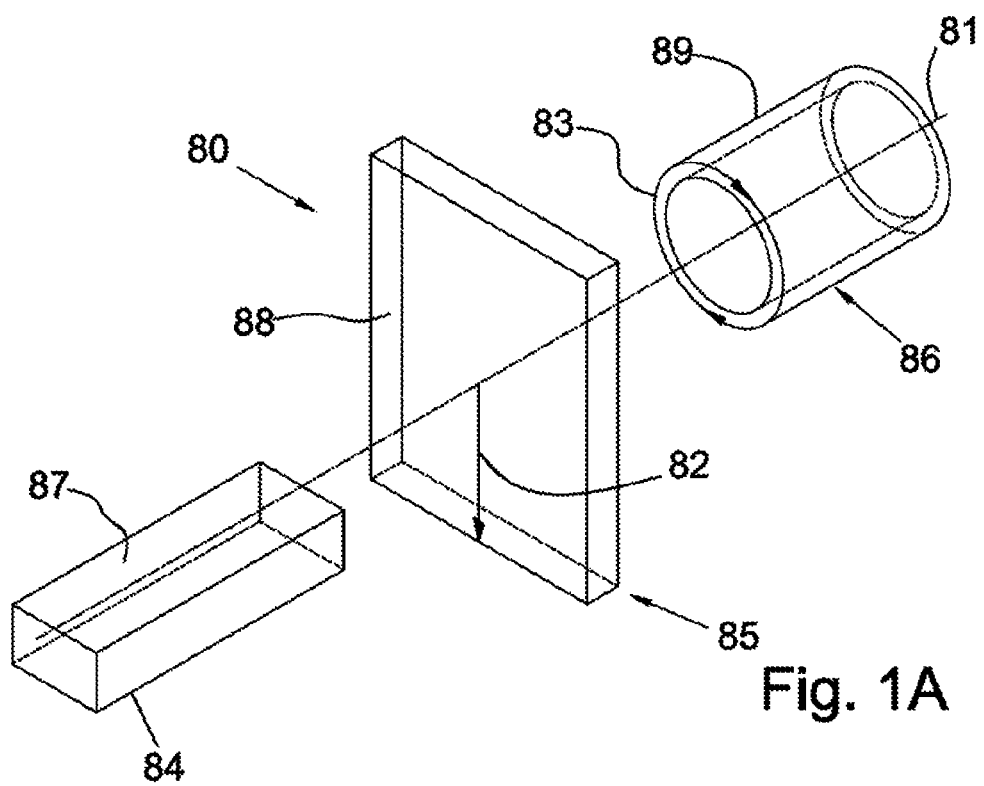
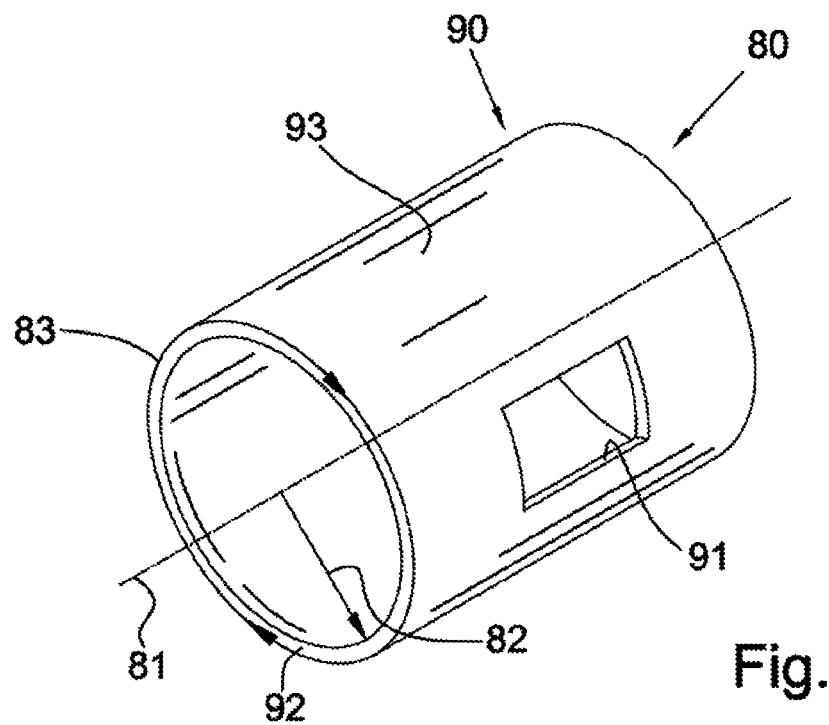
Fig. 1A
Fig. 1B

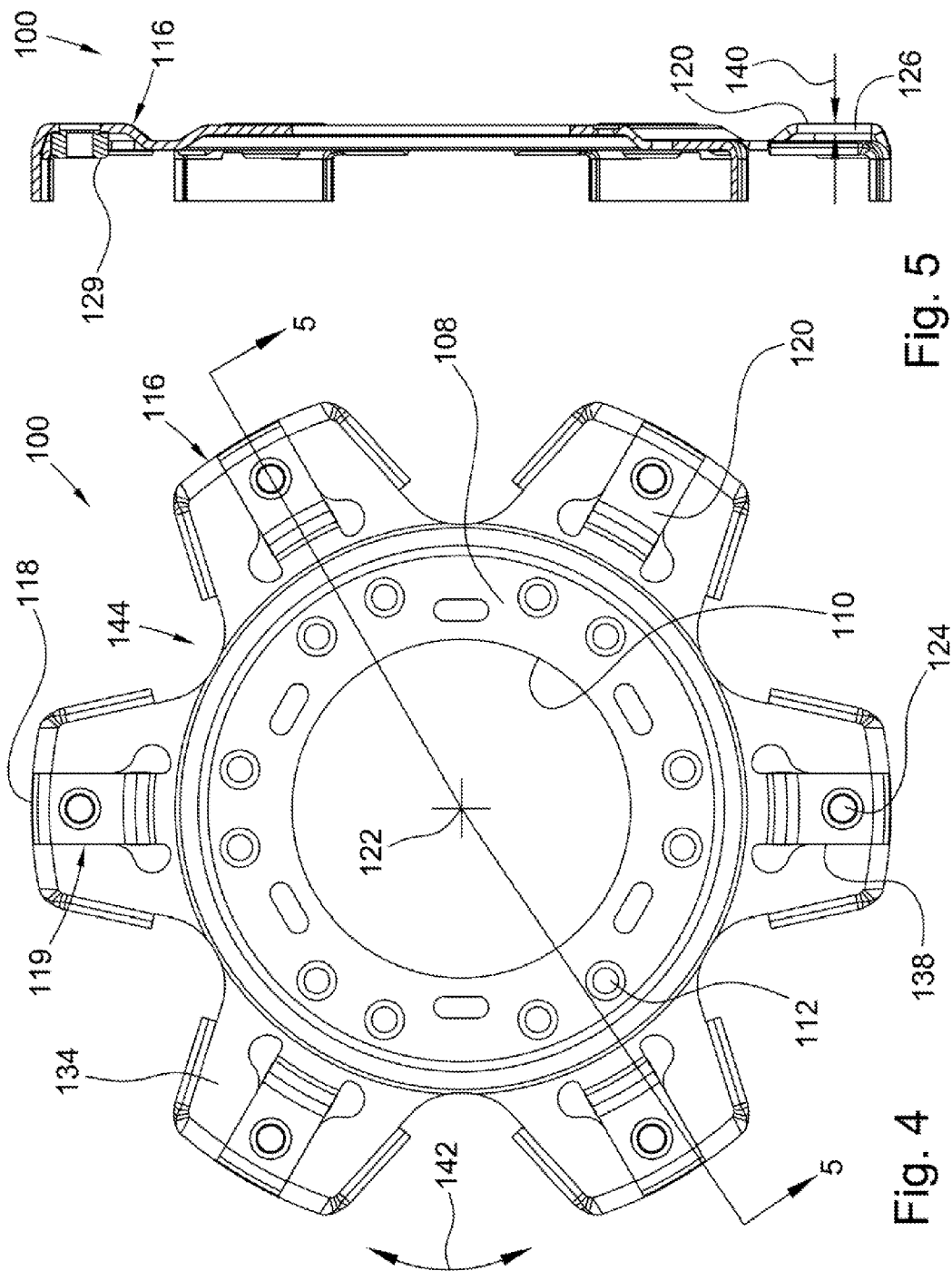

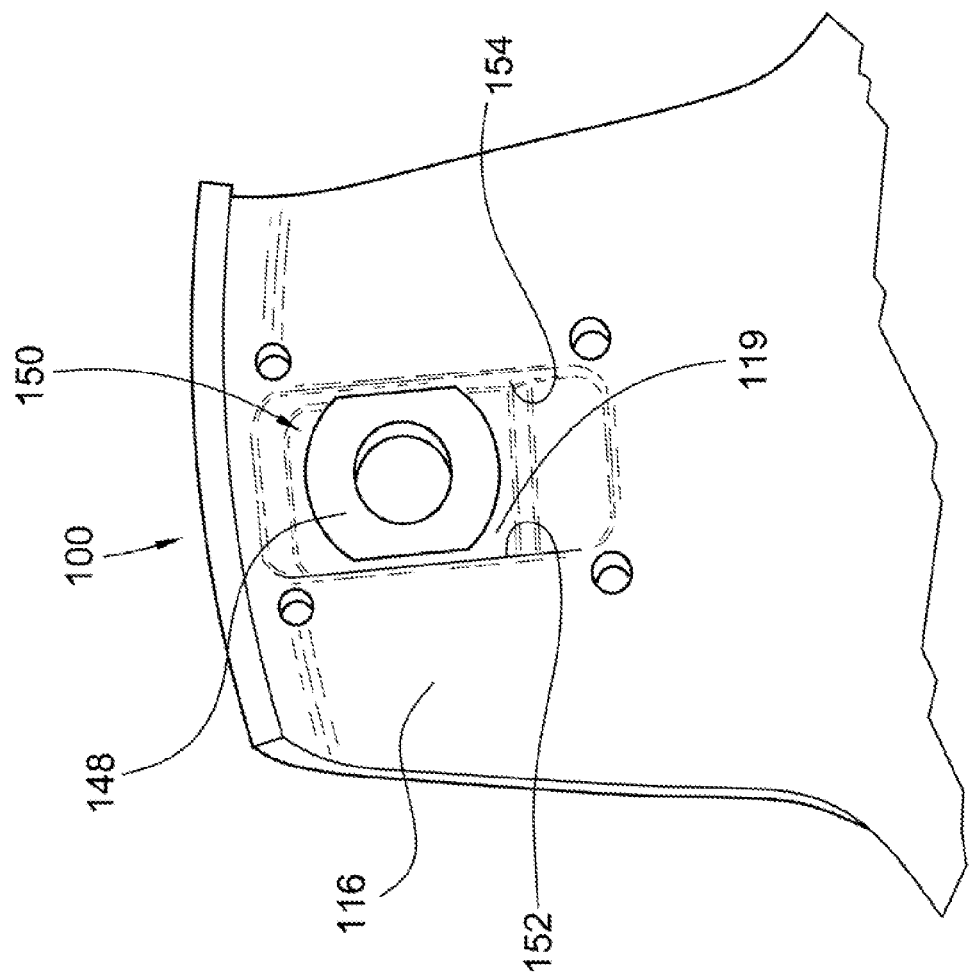
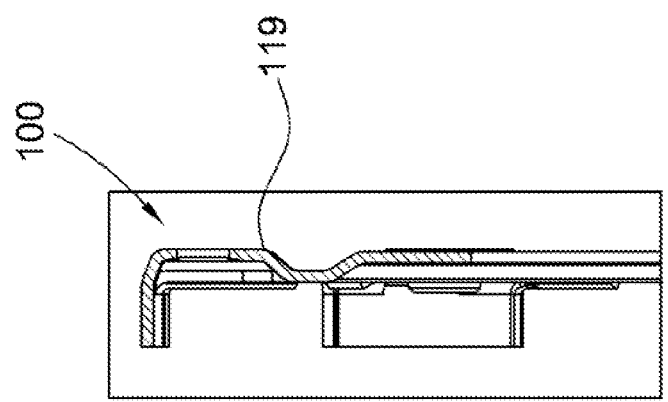

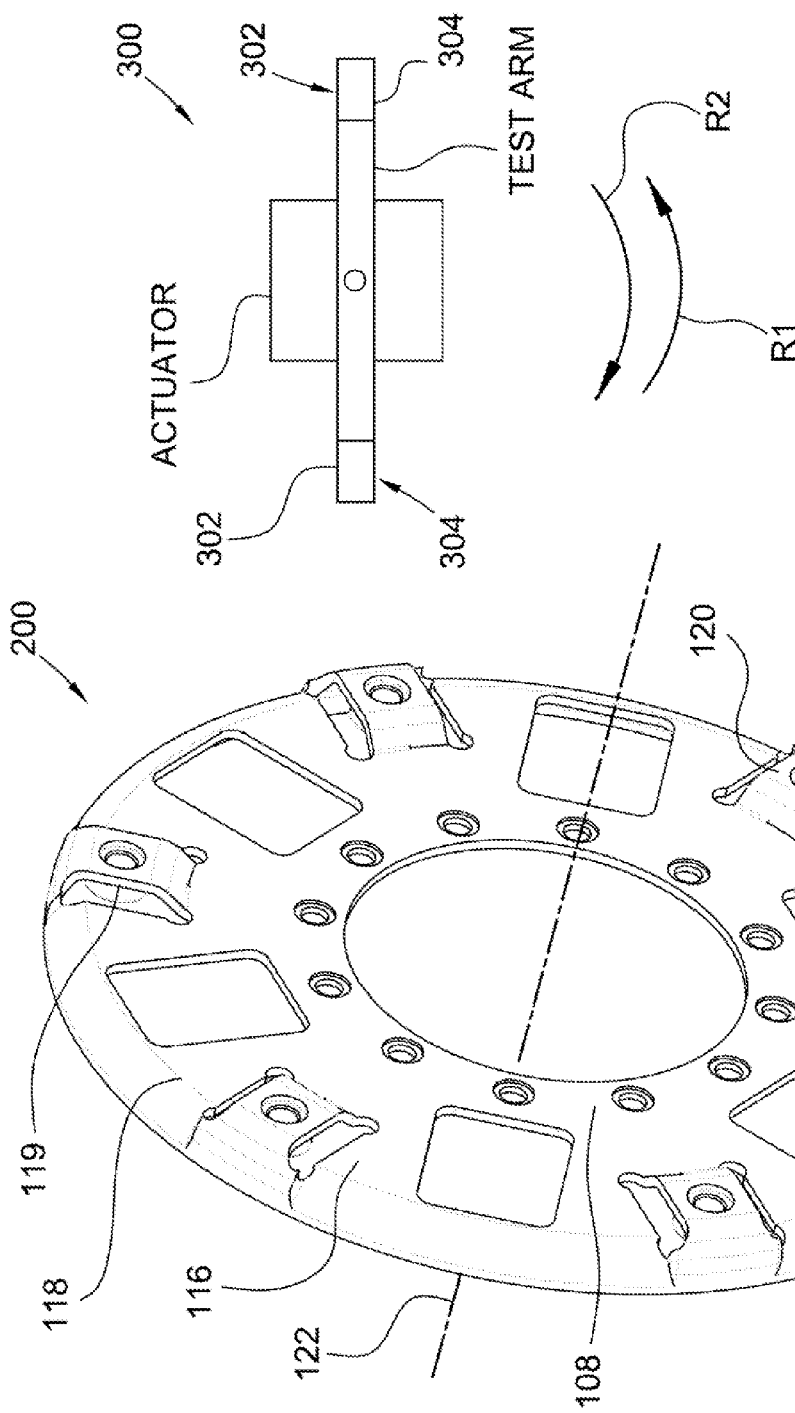

DRIVE PLATE WITH LANCED DRIVE TABS

CROSS-REFERENCE TO RELATED APPLICATIONS

This application claims the benefit under 35 U.S.C. §119 (e) of U.S. Provisional Application No. 61/322,491 filed on Apr. 9, 2010 which application is incorporated herein by reference.

FIELD OF THE INVENTION

The invention relates generally to a drive plate for a torque converter, in particular, a drive plate having lanced drive tabs for engagement with a testing device.

BACKGROUND OF THE INVENTION

Commonly owned U.S. Pat. No. 7,481,050 describes a drive plate having raised portions, for lugs, including sloped sides.

BRIEF SUMMARY OF THE INVENTION

According to aspects illustrated herein, there is provided a drive plate for a torque converter, including: an annular shaped inner portion including an inner periphery for the drive plate and a plurality of openings for receiving fasteners for connection to a front cover of the torque converter; a plurality of outer portions along an outer periphery for the drive plate; and a respective drive tab for each outer portion. The respective drive tab includes: a top surface disposed outward from said each outer portion in an axial direction and substantially orthogonal to an axis of rotation for the drive plate; an opening in the top surface for receiving a fastener for connecting the drive plate to a flex plate; and first and second surfaces extending from the top surface and substantially parallel to an axis of rotation for the drive plate.

According to aspects illustrated herein, there is provided a drive plate for a torque converter, including: an annular shaped inner portion including an inner periphery for the drive plate and a plurality of openings for receiving fasteners for connection to a front cover of the torque converter; a plurality of outer portions along an outer periphery for the drive plate; and a respective drive tab for each outer portion. The respective drive tab includes: a top surface disposed outward from said each outer portion in an axial direction and substantially orthogonal to an axis of rotation for the drive plate; an opening in the top surface for receiving a fastener for connection to a flex plate; and first and second surfaces extending from the top surface and substantially parallel to an axis of rotation for the drive plate. Each outer portion and the top surface are formed from a single piece of material; the first and second surfaces are separated by respective spaces from the top surface; and the first and second surfaces have a uniform dimension parallel to the axis of rotation.

BRIEF DESCRIPTION OF THE DRAWINGS

The nature and mode of operation of the present invention will now be more fully described in the following detailed description of the invention taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

FIG. 4 is a front view of the drive plate shown in FIG. 2;

FIG. 5 is a cross-sectional side view of the drive plate shown in FIG. 2 along line 5-5 in FIG. 4;

FIG. 6 is a detail of the drive plate shown in FIG. 2 without a threaded fastener;

FIG. 7 is a detail of the drive plate shown in FIG. 2 with a nested fastener;

FIG. 8 is a front perspective view of a drive plate with lance drive tabs; and,

FIG. 9 is a schematic diagram of a testing device.

DETAILED DESCRIPTION OF THE INVENTION

Figure 2:
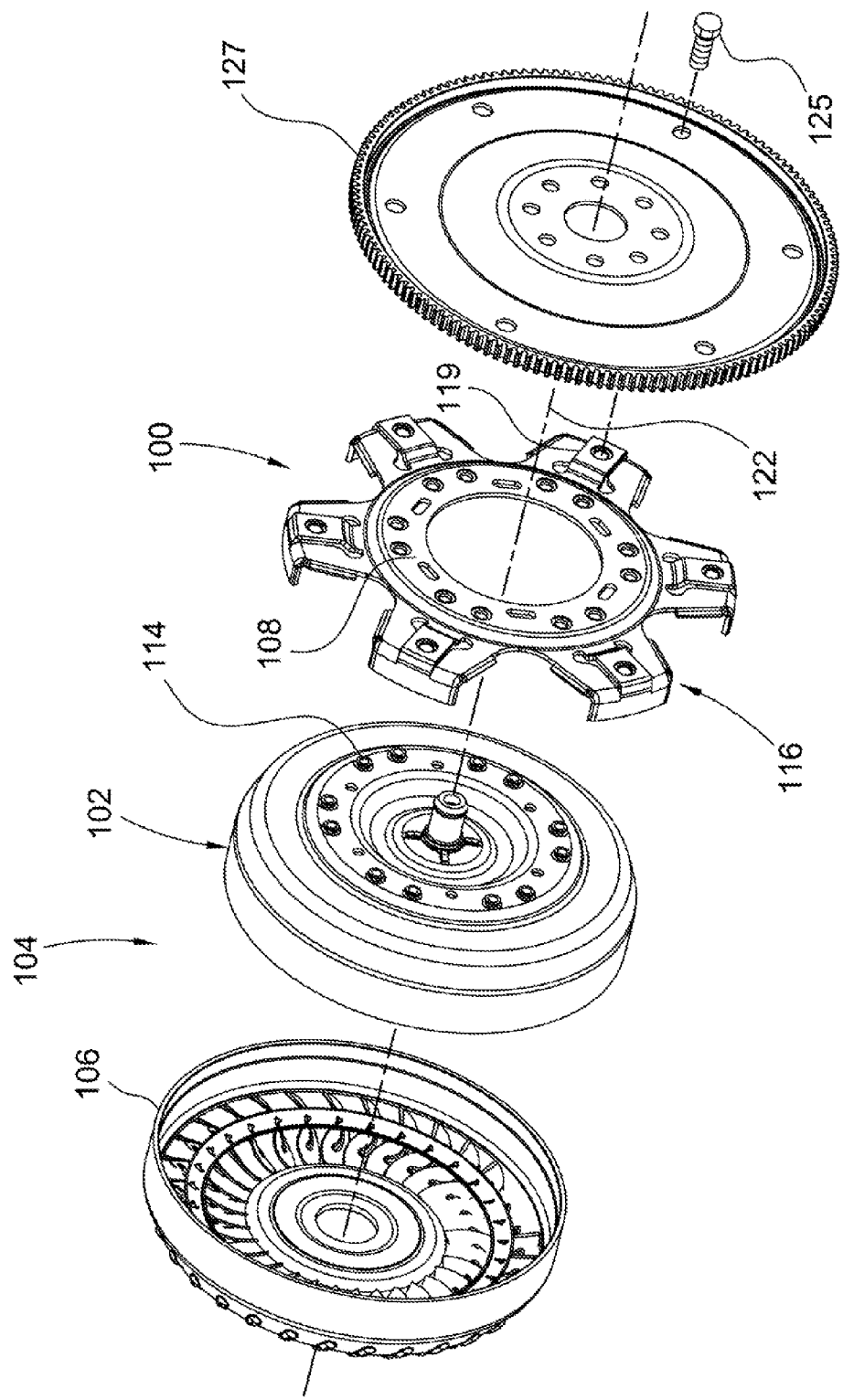
FIG. 2 is a front perspective exploded view of a drive plate with lance drive tabs and the front and back covers for a torque converter.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially,"

"radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a front perspective exploded view of drive plate 100 with lance drive tabs and the front and back covers for a torque converter.

Figure 3:
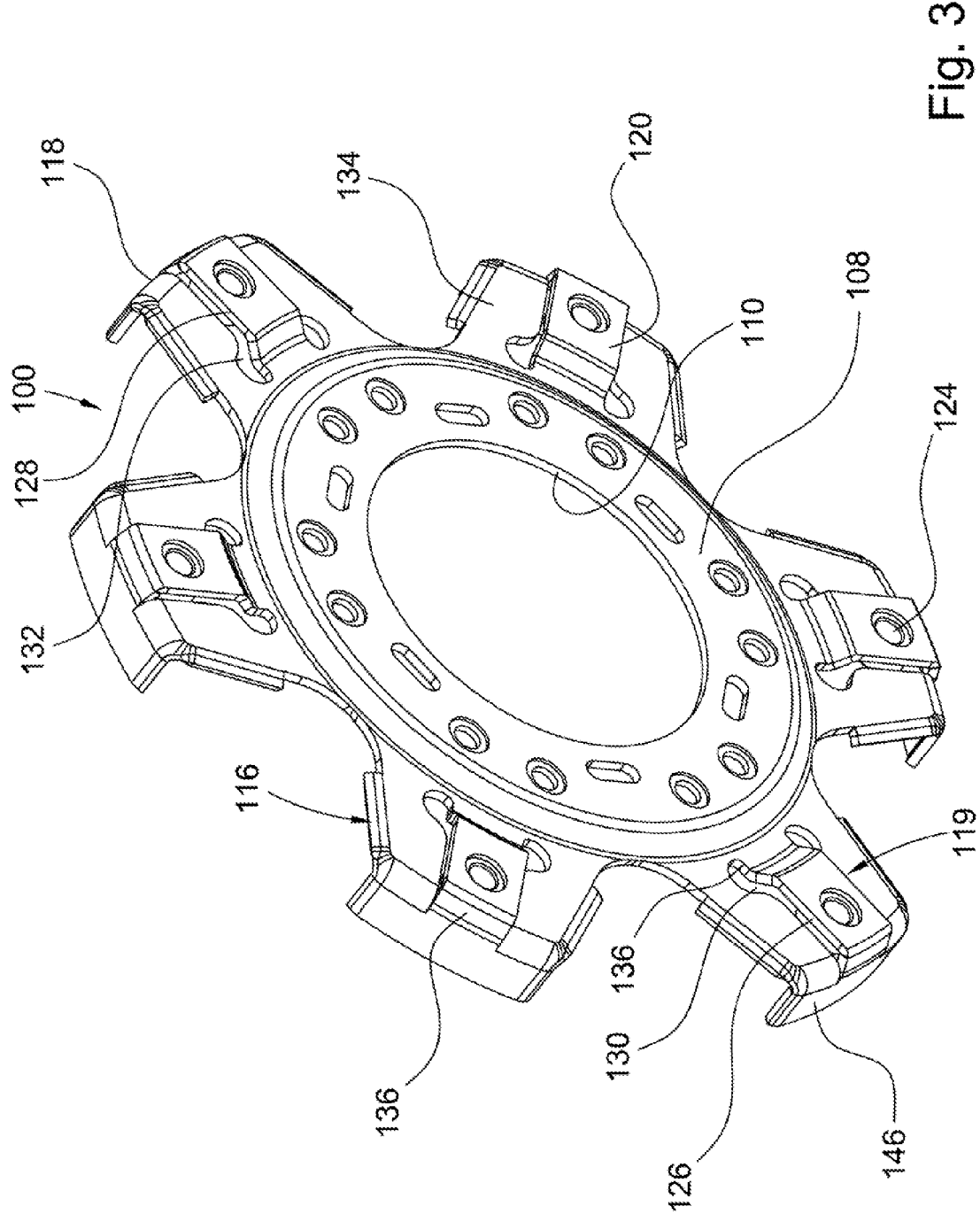
FIG. 3 is a front perspective view of a drive plate shown in FIG. 2.

FIG. 3 is a front perspective view of the drive plate 100 shown in FIG. 2.

FIG. 4 is a front view of drive plate 100 shown in FIG. 2.

FIG. 5 is a cross-sectional side view of drive plate 100 shown in FIG. 2 along line 5-5 in FIG. 4. The following should be viewed in light of FIGS. 2 through 5. Drive plate 100 is arranged for connection to front cover 102 for torque converter 104. Also shown is back cover 106 for the torque converter. The drive plate includes annular shaped inner portion 108 including inner periphery 110 for the drive plate and a plurality of openings 112 for receiving fasteners, for example, fasteners 114, for connection to a front cover of a torque converter. Fasteners 114 can be any fasteners known in the art. In one embodiment, fasteners 114 are extruded rivets. The drive plate also includes plurality of outer portions 116 along outer periphery 118 for the drive plate.

Each outer portion includes a respective raised drive tab 119 with top surface 120 disposed outward from the outer portion in an axial direction (parallel to axis of rotation 122 for the drive plate) and substantially orthogonal to axis 122, as well as opening 124 for receiving fastener 125 for connecting the drive plate to flex plate 127. In one embodiment, the drive plate includes female threaded fasteners 129 for receiving fasteners 125. Fasteners 125 and 129 can be any applicable fasteners known in the art. In one embodiment, fasteners 129 are lugs. Surfaces 126 and 128 of the drive tab extend from the top surface and are substantially parallel to axis 122.

In one embodiment, surfaces 126 and 128 are separated by spaces 130 and 132, respectively, from outer portions 116, for example, surface 134. In one embodiment, surfaces 126 and 128 include ends 136 connected to the outer portion and spaces 130 and 132 are disposed between the ends. In one embodiment, drive plate 100 is formed from a single piece of material. In one embodiment each outer portion and respective top surface are formed from a single piece of material. In one embodiment, drive plate 100 is stamped from a single piece of material, slits 138 are formed in the piece of material to define surfaces 126 and 128 (the piece of material is lanced), and pressure is applied to the portions of the piece corresponding to the drive tabs to push the drive tabs away from the remainder of the piece in the axial direction. It should be understood that slit 138 is not limited to any particular width in the circumferential direction. In one embodiment, surfaces 126 and 128 have a uniform dimension 140 parallel to the axis of rotation.

In one embodiment, each outer portion 116 protrudes radially outward from the inner portion and is separated in circumferential direction 142 from adjacent outer portions by space 144. In one embodiment, the spaces open radially outward. In one embodiment, the drive plate includes portions 146 extending in the axial direction from the outer portions.

FIG. 6 is a detail of drive plate 100 shown in FIG. 2 without a threaded fastener. In one embodiment, the drive plate does not include a female threaded fastener at openings 124.

FIG. 7 is a detail of the drive plate shown in FIG. 2 with nested fastener 148. In one embodiment, the drive plate includes female threaded fasteners 148 nested in spaces 150 formed between surfaces 152 and 154 in outer portions 116. Surfaces 152 and 154 are the "opposing" edges created when surfaces 126 and 128, respectively are formed, for example, when portions 116 are lanced as described above. Opposing portions of the outer periphery of fastener 148 are flattened so that the opposing portions matingly engage with surfaces 152 and 154, preventing the fasteners from rotating.

FIG. 8 is a front perspective exploded view of drive plate 200 with lance drive tabs and the front and back covers for a torque converter. The following should be viewed in light of FIGS. 2 through 6. Unless noted otherwise, the discussion regarding drive plate 100 is applicable to drive plate 200. In one embodiment, outer periphery 118 of drive plate 200 is substantially uniform and at a uniform radial distance from axis 122. For example, drive plate 200 does not include spaces 144 between drive tabs.

FIG. 9 is a schematic diagram of testing device 300. The test device includes a test arm connected to an actuator. The actuator rotates the test arm in rotational direction R1 or R2. Protrusions 302 of the test arm extend away from the actuator and the main portion of the test arm (out of the page) and include respective surfaces 304. In one embodiment, surfaces 126 and 128 are for engagement with respective surfaces 304. Surfaces 126 and 128 and respective surfaces 304 are substantially parallel during the engagement. The testing device is for applying a torque load to surfaces 126 and 128 when the drive plate is secured to a front cover, for example, front cover 102, such that the torque load is transferred to the front cover causing the front cover to rotate. For example, surfaces 304 can be used to rotate the front cover in one rotational direction when engaged with surfaces 126, and can be used to rotate the front cover in an opposite rotational direction when engaged with surfaces 128. That is, the test device is used for dynamic testing of a torque converter, such as torque converter 104, prior to installing the torque converter in a vehicle. By enabling a parallel configuration of surfaces 126 and 128 and respective surfaces 304 when these surfaces are engaged, slippage forces between surfaces 126 and 128 and respective surfaces 304 in the axial direction due to the applied torque are minimized. Thus, surfaces 126 and 128 and respective surfaces 302 do not slip with respect to each other, enabling a stable, safe, efficient, and predictable transmission of the load torque from device 300 to the front cover.

Although drive plates 100 and 200 are shown with six drive tabs, it should be understood that the drive plate is not limited to any particular number of drive tabs and that other numbers of drive tabs are possible.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A drive plate for a torque converter, comprising:
an annular shaped inner portion including an inner periphery for the drive plate and a plurality of openings for receiving fasteners for connection to a front cover of the torque converter;
a plurality of outer portions along an outer periphery for the drive plate; and,
a respective drive tab for each outer portion, the respective drive tab including:
a top surface disposed outward from said each outer portion in an axial direction and substantially orthogonal to an axis of rotation for the drive plate;
an opening in the top surface for receiving a fastener for connecting the drive plate to a flex plate; and,
first and second side surfaces extending from the top surface and substantially parallel to an axis of rotation for the drive plate.

2. The drive plate of claim 1 wherein:
each outer portion includes a respective first surface; and,
the first and second side surfaces are separated from the respective first surfaces by respective spaces.

3. The drive plate of claim 1 wherein:
said each outer portion and the top surface are formed from a single piece of material;
the first and second side surfaces are separated in the axial direction by respective spaces from said each outer portion; and,
the first and second side surfaces have a uniform dimension parallel to the axis of rotation.

4. The drive plate of claim 1 wherein the outer periphery is at a uniform radial distance from the axis of rotation between said each outer portion.

5. The drive plate of claim 1 wherein said each outer portion protrudes radially outward from the inner portion and is separated in a circumferential direction from adjacent outer portions by a respective space.

6. The drive plate of claim 5 wherein the respective spaces open radially outward.

7. The drive plate of claim 1 wherein:
the first and second surfaces are for engagement with respective surfaces for protrusions for a testing device;
the first and second side surfaces and the respective surfaces for the protrusions are substantially parallel during the engagement; and,
the testing device is for applying a torque load to the first and second side surfaces when the drive plate is secured to the front cover such that the torque load is transferred to the front cover causing the front cover to rotate.

8. A drive plate for a torque converter, comprising:
an annular shaped inner portion including an inner periphery for the drive plate and a plurality of openings for receiving fasteners for connection to a front cover of the torque converter;
a plurality of outer portions along an outer periphery for the drive plate; and,
a respective drive tab for each outer portion, the respective drive tab including:
a top surface disposed outward from said each outer portion in an axial direction and substantially orthogonal to an axis of rotation for the drive plate;
an opening in the top surface for receiving a fastener for connection to a flex plate; and,
first and second side surfaces extending from the top surface and substantially parallel to an axis of rotation for the drive plate, wherein:
each outer portion includes a respective first surface;
the plurality of outer portions and the respective drive tabs are formed from one only single piece of material;
the first and second side surfaces are separated by respective spaces from the respective first surfaces; and,
the first and second side surfaces have a uniform dimension parallel to the axis of rotation.

9. The drive plate of claim 8 wherein:
the first and second side surfaces are for engagement with respective surfaces for protrusions for a testing device;
the first and second side surfaces and the respective surfaces for the protrusions are substantially parallel during the engagement; and,
the testing device is for applying a torque load to the first and second side surfaces when the drive plate is secured to the front cover such that the torque load is transferred to the front cover causing the front cover to rotate.

10. A drive plate for a torque converter, comprising:
an annular shaped inner portion including an inner periphery for the drive plate and a plurality of openings for receiving fasteners for connection to a front cover of the torque converter;
a plurality of outer portions forming an outer periphery for the drive plate, each outer portion in the plurality of outer portions:
extending from the inner portion in a direction orthogonal to an axis of rotation for the drive plate; and,
including a respective first surface;
a respective drive tab for each outer portion, the respective drive tab:
extending from the respective first surface; and,
including:
a top surface;
an opening in the top surface for receiving a fastener for connecting the drive plate to a flex plate; and,
first and second side surfaces extending from the top surface, wherein a circle centered on an axis of rotation for the drive plate and orthogonal to the axis of rotation passes axially between the respective first surfaces and the top surfaces without intersecting the first and second side surfaces.

* * * * *